June 19, 1934. M. O. TEETOR 1,963,725
PISTON AND PISTON RING
Filed Sept. 8, 1933
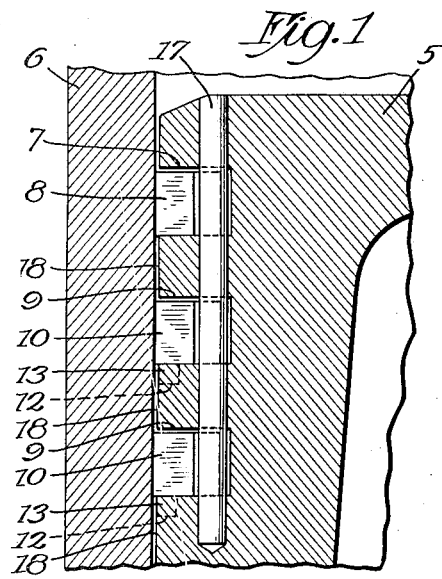
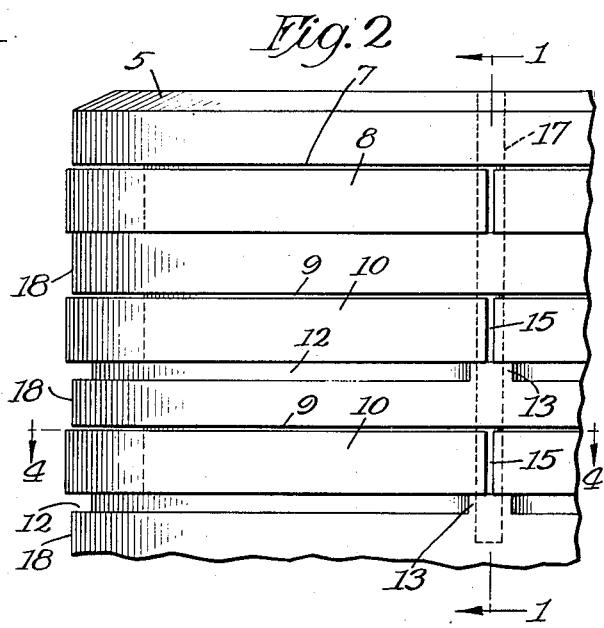
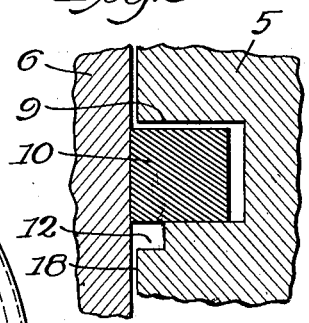
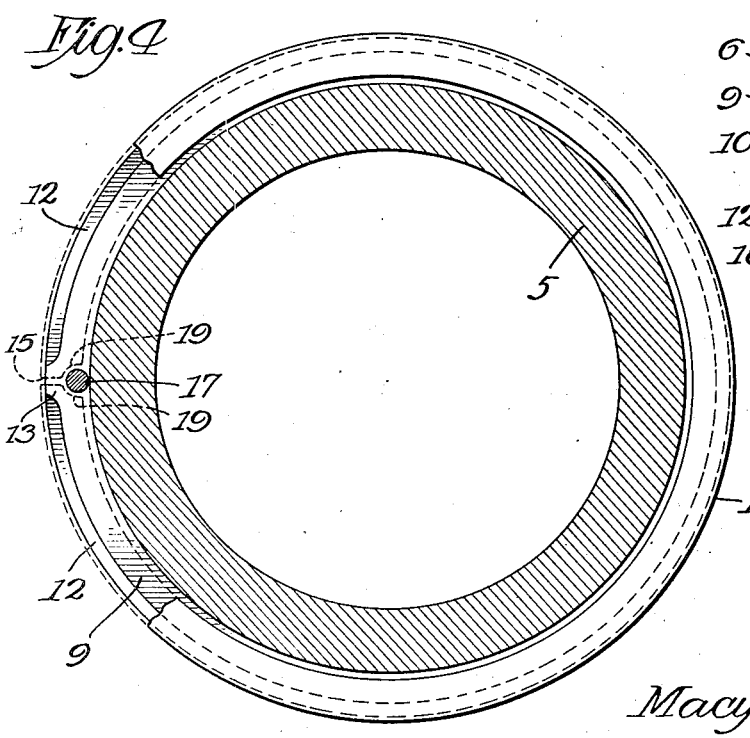
Inventor
Macy O. Teetor
By Rector, Hibben, Davis & Macauley Attys.

Patented June 19, 1934

1,963,725

UNITED STATES PATENT OFFICE 1,963,725

PISTON AND PISTON RING

Macy O. Teetor, Newcastle, Ind., assignor to The Perfect Circle Company, Hagerstown, Ind., a corporation of Indiana Application September 8, 1933, Serial No. 688,541

5 Claims. (Cl. 309—8)

My invention relates to pistons and piston rings for internal combustion engines and the like.

The principal object of my invention is to provide a novel combination of piston ring and piston groove whereby an effective seal against compression leakage and enhanced lubrication characteristics and oil economy are accomplished.

The objects of my invention will more fully appear from the following description, reference being had to the accompanying drawing in which:

Fig. 1 is a detail vertical section taken through part of the head of the piston, as on the line 1—1 of Fig. 2;

Fig. 2 is a side elevation of part of the piston head and piston rings;

Fig. 3 is a fragmentary detail section taken through the piston ring and a portion of the piston head; and Fig. 4 is a cross section through the piston head as on the line 4—4 of Fig. 2, the end portions of the piston ring being illustrated by dotted lines.

The piston 5 as usual operates in the engine cylinder 6. When three compression rings are employed, the piston is preferably provided with the usual rectangular groove 7 at the top and a plain compression ring 8 is mounted in this groove. The two lower grooves 9 and rings 10, mounted therein, are of novel construction in accordance with my invention. When but two compression rings are to be used on a piston the conventional groove 7 and ring 8 are preferably dispensed with.

The outer corner of the lower side of each ring groove 9 is cut away to provide a shallow channel 12 which is preferably, though not necessarily, continuous except for an uncut portion 13 forming a dam. The channel is preferably rectangular in cross-section and small in size relative to the ring groove itself, being preferably not more in height than one-third the height of the ring groove and in depth not more than one-third the depth of the ring groove.

The joints or gaps 15 in the rings are held in vertical alignment with the ends of the lower rings 10 extending over the dams 13. This position of the ring is maintained by a pin 17 which extends through holes in the piston lands 18 and passes through curved recesses 19 (Fig. 4) which are formed in the ends of the rings to accommodate the pin. The pin 17 may be fastened in the holes by any desired means.

The channel 12, the bottom side of the ring 10 and the cylinder wall constitute an oil reservoir which is substantially terminated at its ends by the dam 13. The land 18 below the particular ring 10 has a minimum clearance when the piston is at a high temperature, the clearance being just sufficient to prevent the lands from riding on the cylinder wall. Upon the downstroke of the piston the lower outer corner of the ring 10, being in firm engagement with the cylinder wall, scrapes oil from the cylinder wall and a sufficient volume of oil under pressure is substantially trapped in the oil reservoir to substantially seal the lower edge of the ring at the lower side of the piston groove and also seal the ring at the cylinder wall. The dams 13 effectively close the oil reservoir at its ends. The ends of the ring are seated on the top side of the dam 13 so that the oil in the reservoir cannot escape through the joint in the ring and at the same time the blow-by of the compression gases is greatly reduced as the gases cannot pass through the ring joint into the oil reservoir.

It will be clear that various changes may be made without departing from the spirit of my invention. I have found that where three compression rings are employed on a piston, the top ring and ring groove may be of the convention ring forms as shown in Figs. 1 and 2. Where but two compression rings are employed best results are accomplished by having both rings and piston grooves constructed in accordance with my invention. While I preferably employ a continuous channel except for the dam at the ring joint and believe that accomplishes the most efficiency, yet additional dams may be employed so long as the channel is dammed adjacent the ends of the ring. Further, I do not wish to be limited to the use of the pin 17 for retaining the rings in angular position as other means may be employed.

I claim:

1. In an internal combustion engine, the combination of a piston provided with a groove having a channel formed in its lower outer corner and a dam in the channel, of a piston ring split to form a joint and mounted in said groove with the ends of the ring positioned over said dam.

2. In an internal combustion engine, the combination of a piston provided with a groove having a channel formed in its lower outer corner and a dam in the channel, of a piston ring split to form a joint and mounted in said groove with the ends of the ring positioned over said dam, and means for maintaining the ends of the ring over said dam.

3. In an internal combustion engine, the combination of a piston provided with a groove having a channel of substantially uniform height and depth formed in its outer lower corner and a dam in the channel, of a piston ring split to form a joint and mounted in said groove with the ends of the ring positioned over the dam, the channel, the piston ring and the cylinder wall forming a reservoir for oil to seal substantially uniformly the ring at its lower edge with the ring groove and cylinder wall.

4. In an internal combustion engine, the combination of a piston provided with a groove having a channel in its outer lower corner, the height and depth of the channel being not more than one-third of the height and depth of the groove, and a dam being formed in the channel, of a piston ring split to form a joint and mounted in said groove with the ends of the ring positioned over said dam.

5. In an internal combustion engine, the combination of a piston provided with a groove having a channel in one of its outer corners, of a piston ring split to form a joint and mounted in said groove, and means adjacent the ends of the piston ring for terminating the channel, the channel forming an oil reservoir and said means substantially preventing oil from passing from said reservoir to the joint.

MACY O. TEETOR.